United States Patent
Koda

(10) Patent No.: US 10,845,633 B2
(45) Date of Patent: Nov. 24, 2020

(54) DISPLAY APPARATUS

(71) Applicant: DENSO CORPORATION, Kariya, Aichi-pref. (JP)

(72) Inventor: Kazuyoshi Koda, Kariya (JP)

(73) Assignee: DENSO CORPORATION, Kariya (JP)

( * ) Notice: Subject to any disclaimer, the term of this patent is extended or adjusted under 35 U.S.C. 154(b) by 72 days.

(21) Appl. No.: 16/351,602

(22) Filed: Mar. 13, 2019

(65) Prior Publication Data

US 2019/0212606 A1    Jul. 11, 2019

Related U.S. Application Data

(63) Continuation of application No. PCT/JP2017/032417, filed on Sep. 8, 2017.

(30) Foreign Application Priority Data

Sep. 23, 2016   (JP) .................. 2016-185184

(51) Int. Cl.
*F21V 21/00* (2006.01)
*G02F 1/1333* (2006.01)
(Continued)

(52) U.S. Cl.
CPC ..... *G02F 1/133308* (2013.01); *G02B 6/0051* (2013.01); *G02B 6/0061* (2013.01); *G02B 6/0068* (2013.01); *G02B 6/0073* (2013.01); *G02B 6/0088* (2013.01); *G02B 6/0093* (2013.01); *G02F 1/1333* (2013.01); *G09F 9/00* (2013.01); *G02F 2001/13332* (2013.01);
(Continued)

(58) Field of Classification Search
CPC ............. G02F 1/133308; G02F 1/1333; G02F 2001/133314; G02F 2001/133317; G02F 2001/13332; G02F 2001/133334; G02F 2201/503; G02F 2202/28; G02B 6/0051; G02B 6/0061; G02B 6/0068; G02B 6/0073; G02B 6/0088; G02B 6/0093; G09F 9/00
USPC ....................................................... 362/615
See application file for complete search history.

(56) References Cited

U.S. PATENT DOCUMENTS

| 2007/0165424 | A1 | 7/2007 | Sakai |
| 2008/0220184 | A1 | 9/2008 | Sakurai et al. |

(Continued)

FOREIGN PATENT DOCUMENTS

| JP | 2008-203591 A | 9/2008 |
| JP | 2008-250286 A | 10/2008 |

(Continued)

*Primary Examiner* — Laura K Tso
(74) *Attorney, Agent, or Firm* — Harness, Dickey & Pierce, P.L.C.

(57) ABSTRACT

A display apparatus includes: an indicator configured to display an image on a display surface of the indicator; a cover plate configured to stick on the display surface of the indicator with a transparent adhesive, and including a light transmitting section to enable the display surface to be visible; an optical device arranged behind the indicator through a gap to the indicator, and configured to supply a light to a back surface of the indicator for a display on the indicator; a first support configured to support the optical device; a second support configured to support the cover plate; and a cushioning material provided at the gap and be in contact with both of the indicator and the optical device.

7 Claims, 2 Drawing Sheets

(51) Int. Cl.
*F21V 8/00* (2006.01)
*G09F 9/00* (2006.01)

(52) U.S. Cl.
CPC ............ *G02F 2001/133314* (2013.01); *G02F 2001/133317* (2013.01); *G02F 2001/133331* (2013.01); *G02F 2001/133334* (2013.01); *G02F 2201/503* (2013.01); *G02F 2202/28* (2013.01)

(56) References Cited

U.S. PATENT DOCUMENTS

| | | | |
|---|---|---|---|
| 2014/0022485 A1* | 1/2014 | Kuo | G02F 1/133308 |
| | | | 349/58 |
| 2014/0176872 A1 | 6/2014 | Miyazaki | |
| 2015/0185411 A1* | 7/2015 | Ikuta | G02B 6/0091 |
| | | | 348/790 |
| 2015/0253615 A1 | 9/2015 | Ryu et al. | |
| 2015/0341587 A1* | 11/2015 | Chikazawa | G02B 6/0091 |
| | | | 348/725 |
| 2017/0045679 A1* | 2/2017 | Matsumoto | G02F 1/133308 |
| 2018/0113352 A1* | 4/2018 | Arita | G02B 6/0055 |

FOREIGN PATENT DOCUMENTS

| | | | |
|---|---|---|---|
| JP | 2014122973 A | | 7/2014 |
| JP | 2015148718 A | | 8/2015 |
| JP | 2016037173 A | | 3/2016 |
| JP | 2017151360 A | | 8/2017 |
| KR | 2007-0076520 A | | 7/2007 |

* cited by examiner

DISPLAY APPARATUS

CROSS REFERENCE TO RELATED APPLICATIONS

The present application is a continuation application of International Patent Application No. PCT/JP2017/032417 filed on Sep. 8, 2017, which designated the United States and claims the benefit of priority from Japanese Patent Application No. 2016-185184 filed on Sep. 23, 2016. The entire disclosures of all of the above applications are incorporated herein by reference.

TECHNICAL FIELD

The present disclosure relates to a display apparatus.

BACKGROUND

A display apparatus is configured such that a cover plate is arranged at a display surface (such as a liquid display) of an indicator, and the display surface of the indicator and the cover plate are stuck with a transparent adhesive.

SUMMARY

The present disclosure provides a display apparatus in which a cover plate is stuck on a display surface of an indicator with a transparent adhesive.

BRIEF DESCRIPTION OF DRAWINGS

The above and other objects, features and advantages of the present disclosure will become more apparent from the following detailed description made with reference to the accompanying drawings, in which.

DETAILED DESCRIPTION

In a display apparatus, an indicator and an optical device, which is provided behind the indicator and emits a light to a back surface of the indicator, are configured as separate units. The cover plate and optical device are supported by a support member other than the indicator. In the display apparatus, it is necessary to provide a gap for absorbing tolerance in a height direction between the back surface of the indicator and the surface of the optical device. However, the indicator is suspended on the cover plate due to the gap, and stress is applied to a transparent adhesive due to the indicator's own weight. As a result, it causes peeling of the indicator and a display fault such as display distortion of the indicator.

According to an aspect of the present disclosure, a display apparatus includes: an indicator configured to display an image on a display surface of the indicator; a cover plate stuck on the display surface of the indicator with a transparent adhesive, and including a light transmitting section to enable the display surface to be visible; an optical device arranged behind the indicator through a gap to the indicator, and configured to supply a light to a back surface of the indicator for a display on the indicator; a first support configured to support the optical device; a second support configured to support the cover plate; and a cushioning material provided at the gap and be in contact with both of the indicator and the optical device.

Accordingly, the cushioning material is provided at the gap between the indicator and the optical device, it is possible to alleviate the stress applied to the transparent adhesive due to the weight of the indicator. In addition, even when the size of the gap is changed with the tolerance in a height direction, a change in the gap can be absorbed by the cushioning material. Therefore, there is no need to finely adjust the thickness of the cushioning material. As a result, it is possible to easily assemble the indicator and the optical device.

Figure 1:
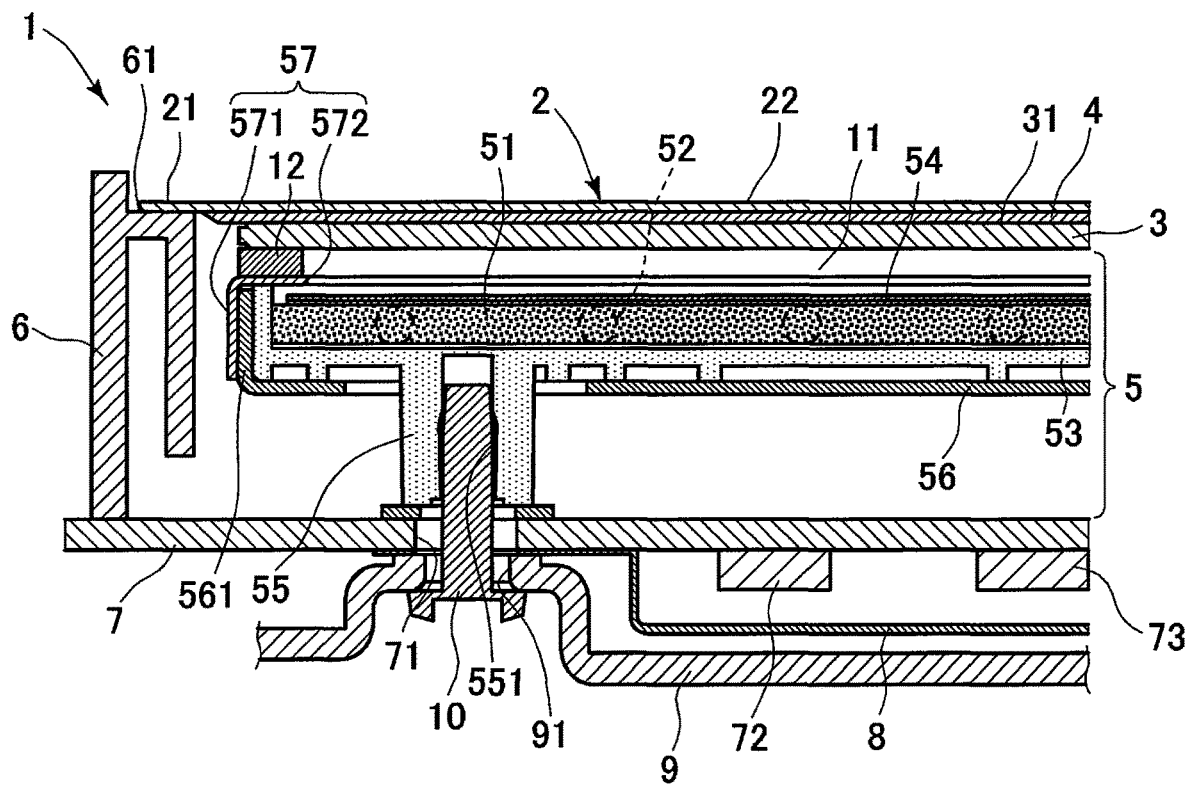
FIG. 1 is a cross sectional view of a display apparatus.

Embodiments of the present disclosure will be described below with reference to the drawings. A display apparatus 1 illustrated in FIG. 1 is mounted to a position facing a driver's seat in, for example, an instrument panel of a vehicle, and is configured as a combination meter for displaying a variety of vehicular information such as vehicle speed and rotational number of an engine.

The display apparatus 1 includes a dial 2, an indicator 3, an optical device 5, an upper case 6, a circuit board 7, a shielding member 8, a lower case 9 and a cushioning material 12.

The dial 2 is a member for configuring a display section of the display apparatus 1, the surface of the dial 2 is arranged to be viewable. The dial 2 is made of transparent resin, specifically made of polycarbonate. The dial 2 is formed in a flat plate. A light shielding section 21 and a light transmitting section 22, which is not provided with the light shielding section 21, are arranged at the front surface or the back surface of the dial 2. The light shielding section 21 is formed by, for example, printing. The light transmitting section 22 serves as a display section of the display apparatus 1. The light transmitting section 22 is formed in a shape to cover the entire display surface 31 at a position facing the display surface 31 of the indicator 3. The light transmitting section 22 allows the display surface 31 to be visually recognized.

It is noted that the light transmitting section is formed also at a position other than the position facing the indicator 3. The light transmitting section at a position other than the position facing the indicator 3 is regarded as the other light transmitting section. The other light transmitting section configures a display section other than the display of the indicator 3 in the display apparatus 1. For example, the other light transmitting section may be a scaled guiding meter for instructing, for example, the vehicle speed or the number of revolutions with a pointer, or may be a lighting section of a directional signal indicator.

The dial 2 is supported by the upper case 6. Specifically, a mounting section 61 is formed at the upper case 6. A section (the section not overlapped with the indicator 3) of the dial 2 is placed on the mounting section 61. The section of the dial 2 is pressed by another member (not shown) from above. That is, the dial 2 is pinched between the mounting section 61 and a separate member so that the displacement of the dial 2 in a vertical direction is restricted. It is noted that the dial 2 corresponds to a cover plate according to the present disclosure.

The indicator 3 is a liquid display that displays a variety of images at the display surface 31 with the use of liquid crystal. The indicator 3 displays, for example, a warning that a seat belt is not fastened, or a cruise control display when a cruise control is installed in the vehicle, or a display related to navigation (for example, a travelling direction at the next intersection) when a navigation device is mounted to the vehicle.

The indicator 3 is arranged at the back of the dial 2 and is arranged to be parallel to the dial 2. Specifically, the indicator 3 is an active matrix type liquid crystal display having a built-in thin film transistor (TFT) as a switching device.

The indicator 3 includes, for example, two transparent glass substrates, a liquid crystal layer arranged between both of the transparent glass substrates, and a polarizing plate arranged at the outer side of the glass substrate. Color filters, TFTs and the like are arranged on the glass substrate. The indicator 3 is formed in, for example, a rectangular flat plate in a plan view. The indicator 3 displays a variety of images by controlling the liquid crystal layer of the indicator 3 and controlling the emission of light supplied from the optical device 5 to the display surface 31.

The indicator 3 is configured as a unit separate from the optical device 5. In other words, the indicator 3 and the optical device 5 are separated from each other before being assembled into the upper case 6 or the circuit board 7.

The indicator 3 is stuck on the dial 2 with the transparent adhesive 4 as an optical adhesive. In other words, the transparent adhesive 4 is interposed between the display surface 31 of the indicator 3 and the rear surface of the dial 2. The transparent adhesive 4 is a transparent adhesive such as an acrylic type and a silicon type exclusively for optical components. In the present embodiment, the transparent adhesive 4 may also be a sheet-type OCA (Optical Clear Adhesive), but may also be a liquid-type UV curable resin (OCR: Optical Clear Resin).

The dial 2 is arranged on the indicator 3 so that the indicator 3 can be protected and the appearance of the display apparatus 1 can be enhanced as compared with a situation where the indicator 3 is in exposure. Moreover, the indicator 3 and the dial 2 are stuck together with the transparent adhesive 4 so that an air layer disappears between the indicator 3 and the dial 2. Thus, it is possible to inhibit the degradation of visibility due to the surface reflection of external light.

The optical device 5 is disposed behind the display 3 through a gap 11 to the indicator 3. The gap 11 is for absorbing the tolerance in the height direction. The optical device 5 is a backlight that supplies light for a display of the indicator 3 to the back surface of the indicator 3.

The optical device 5 includes: a light guide plate 51 formed of acrylic or the like and arranged to cover the entire back surface of the indicator 3; a plurality of LEDs 52 each configured to emit light to the side edges of the light guide plate 51; a white frame 53 arranged to cover the side surface and back surface of the light guide plate 51 and configured to increase reflection efficiency inside the light guide plate 51 to enhance the luminance at an end surface of the light guide plate 51; a diffusion sheet 54 arranged to cover the surface (light emission surface) of the light guide plate 51 to diffuse light emitted from the surface for emitting the light uniformly; a boss section 55 extending from the white frame 53 to the position of the circuit board 7 in the rear direction; a protective frame 56 provided to cover the side surface and the back surface of the white frame 53 for accommodating and protecting the light guide plate 51, the LEDs 52 and the diffusion layer 54; and a boundary frame 57 is provided in a loop shape along the periphery of the optical device 5.

The protective frame 56 and the boundary frame 57 are formed in a rectangular shape. The perimeter of the protective frame 56 is provided with a wall 561, which rises toward the indicator 3. Furthermore, the perimeter of the boundary frame 57 is provided with a side surface section 571 rising towards the circuit board 7 and a surface section 572 protruding in an inward direction from the side surface section 571.

The protective frame 56 and the boundary frame 57 are overlapped to each other so that the side surface section 571 of the boundary frame 57 is positioned at an outer side of the wall 561 of the protective frame 56. Both of the protective frame 56 and the boundary frame 57 are integrated at a proper location of the wall 561 of the protective frame 56 by locking claws (not shown), which is integrally molded, to the inner side of the side surface section 571 of the boundary frame 57 so that both of the protective frame 56 and the boundary frame 57 are not disengaged.

A screw hole 551 is formed at the boss section 55. The screw hole 551 forms an opening at the tip. A screw groove is formed at the inner wall of the screw hole 551.

The optical device 5 is configured to emit surface light such that the light from the LEDs 52 is incident on the light guide plate 51 and is emitted from the opening formed inside the surface section 572. The surface-emitted light is incident on the back surface of the indicator 3.

The optical device 5 is supported by the circuit board 7 such that a screw 10 inserted from the back surface of the circuit board 7 facing the surface where the optical device 5 is provided is fastened and fixed to the screw hole 551 of the boss section 55. The fixing of the optical device 5 and the circuit board 7 through the boss section 55 and the screw 10 are provided at a plurality of locations.

The optical device 5 and the indicator 3 are configured as separate units. The optical device 5 and the indicator 3 are prepared as separate units before assembled into the display apparatus 1. The optical device 5 and the indicator 3 are directly connected to only the cushioning material 12 in a state where the optical device 5 and the indicator 3 are assembled into the display apparatus 1. In other words, there is no member other than the cushioning material 12 to be directly connected with the optical device 5 and the indicator 3.

The upper case 6 is configured to surround the space between the circuit board 7 and the dial 2 as viewed from the viewer side rather than the circuit board 7 side, and accommodate, for example, the indicator 3 and the optical device 5 in the space. The upper case 6 and the circuit board 7 are fixed to the lower case 9 through, for example, claw fitting or screwing at a position (not shown). In addition, the upper case 6 supports the dial 2 at the mounting section 61 as described above. The upper case 6 also functions as a reflector that reflects light from a light source (not shown) mounted on the optical device 5 or the circuit board 7 to the inner space. The upper case 6 is formed of a resin having a light blocking property such as PP (polypropylene) resin and ABS resin. The upper case 6 corresponds to a second support according to the present disclosure.

The circuit board 7 is arranged behind the dial 2 and the indicator 3 and is parallel to the dial 2 and the indicator 3. The circuit board 7 is a substrate formed in a flat plate for mounting a variety of components. Specifically, a light source (not shown) is mounted on the surface of the circuit board 7. The light source emits light towards the above-mentioned other light transmitting section arranged at the dial 2. In addition, the indicator 3, the optical device 5, the microcontroller 72 for controlling, for example, the rotation of the light source and pointer, a motor (not shown) for driving the rotation of pointer, the power supply circuit 73 for supplying the power to the optical device 5 are mounted on the back surface of the circuit board 7.

The circuit board 7 is a member that supports the optical device 5 or the upper case 6 as described above, and that serves as a reference for positioning the optical device 5 and the upper case 6. In other words, the position of the optical device 5 or the upper case 6 is determined with reference to the circuit board 7.

The circuit board 7 is fixed to the lower case 9. Specifically, a hole 71 is formed at a position of the circuit board 7 facing the boss section 55 of the optical device 5. A hole 91 is formed at a position of the lower case 9 facing the hole 71. The screw 10 is fastened and fixed to the screw hole 55 of the boss section 55 through the holes 71, 91 from outside the lower case 9 so that the optical device 5, the circuit board 7 and the lower case 9 are fixed to each other. It is noted that the circuit board 7 corresponds to a first support according to the present disclosure.

The shielding member 8 is a plate made of metal (such as iron or copper) that is provided to cover a variety of electronic components such as the microcontroller 72 and the power supply circuit 73 mounted on the back surface of the circuit board 7, and to shield the noise from the electronic components or the noise mixed into the electronic components from outside. The shielding member 8 is arranged in the space between the circuit board 7 and the lower case 9, and cannot be visually recognized from the lower case 9. The shielding member 8 is fixed by the screw 10 so that the shielding member 8 is pinched between the fixing section of the circuit board 7 and the fixing section of the lower case 9.

The lower case 9 is arranged behind the circuit board 7 and has a back surface closed, and has an opening at the circuit board 7 side. The lower case 9 is formed of a resin having a light blocking property such as PP (polypropylene) resin or ABS resin. The circuit board 7 is mounted on the opening of the lower case 9. The lower case 9 is fixed to the optical device 5 and the circuit board 7 through the screw 10.

The cushioning material 12 is provided at the gap 11 between the indicator 3 and the optical device 5. Specifically, the cushioning material 12 is in contact with both of the indicator 3 and the optical device 5 between the periphery of the back surface of the indicator 3 and the periphery 572 (the surface section 572 of the boundary frame 57) of the surface of the optical device 5. It is noted that the periphery (peripheral edge) of the display surface 31 of the indicator 3 is set at a non-display region where an image is not displayed, and the cushioning material 12 is arranged at the periphery of the indicator 3. The cushioning material 12 is formed of a material deformable in thickness according to the gap between the periphery of the indicator 3 and the periphery of the optical device 5 when the dial 2 to which the indicator 3 is attached is assembled on the optical device 5. In other words, the cushioning material 12 is formed of a cushioning material absorbing the gap. In particular, the cushioning material 12 is formed of, for example, rubber, polyurethane resin, or a foamed product.

The cushioning material 12 is provided with the contracted thickness. In other words, the thickness after assembly is smaller than the thickness prior to assembly. The cushioning material 12 is removed from the assembled state, the thickness of the cushioning material 12 increases. The cushioning material 12 is a member for maintaining a constant shape prior to assembly, and is different from a liquid adhesive, which does not maintain a constant shape.

The cushioning material 12 may also be provided over the entire circumference of the periphery of the indicator 3 and the optical device 5, or may also be provided at a section of the entire circumference (for example, such as two opposite sides if the periphery is formed in a rectangular shape). The upper surface (the surface as viewed from the indicator 3) and the lower surface (the surface as viewed from the optical device 5) of the cushioning material 12 are adhesive surfaces like a double-sided tape. The cushioning material 12 is adhered to the indicator 3 and the optical device 5 through the adhesive surfaces.

Figure 2:
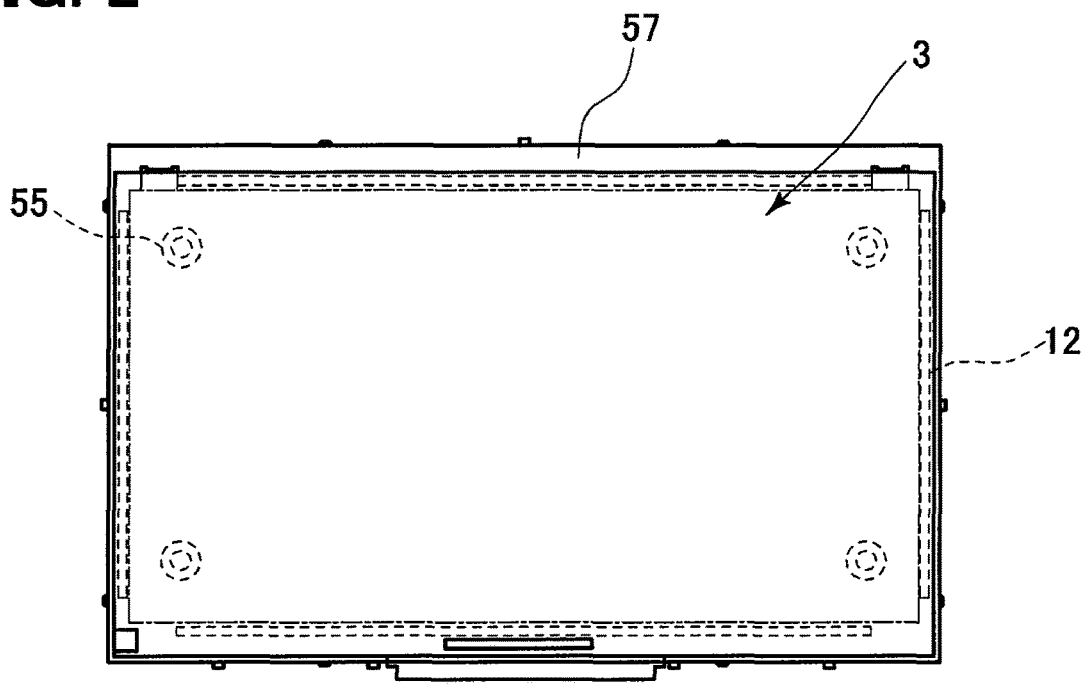
FIG. 2 is a plan view of the display apparatus.

The arrangement position of the cushioning material 12 according to the present embodiment is illustrated in FIG. 2. In the present embodiment, the cushioning material 12 is provided at each of four sides of the rectangular indicator 3 in a plan view and each of four sides of the periphery of the rectangular optical device 5. It is noted that the position of the boss section 55 in FIG. 1 is also shown in FIG. 2. The boss section 55 is provided at four locations. In FIG. 2, the inner peripheral edge of the boundary frame 57 is illustrated by an alternate long and short dash line.

The following describes the assembly of the display apparatus 1. First, the shielding member 8, the circuit board 7 and the upper case 6 in order are mounted on the lower case 9. In addition, the dial 2 and the indicator 3 are stuck together beforehand with the transparent adhesive 4. The cushioning material 12 is stuck at the periphery of the surface of the optical device 5 or the periphery of the back surface of the indicator 3. The dial 2 to which the indicator 3 is stuck is placed on the upper case 6. A sticker release paper at the surface of the cushioning material 12 is peeled off so that the adhesive surface of the cushioning material 12 is in exposure. The cushioning material 12 is adhered to the periphery of the indicator 3 and the periphery of the optical device 5 at a state where the original thickness of the cushioning material 12 is contracted. Lastly, each of the components is fastened and fixed by, for example, the screw 10. Instead of the above, the cushioning material 12 may be adhered beforehand between the indicator 3 and the optical device 5 before assembled at the circuit board 7, and subsequently an integral structure of the dial 2, the indicator 3, the cushioning material 12 and the optical device 5 may be assembled at the circuit board 7 and the upper case 6.

The operation and effect of the present embodiment is described in the following. According to the present embodiment, the indicator 3 and the optical device 5 are configured as separate units. The gap 11 is formed between the indicator 3 and the optical device 5. The gap 11 is capable of absorbing the dimensional tolerance of the optical device 5 and the upper case 6 positioned with reference to the circuit board 7. Since the cushioning material 12 is arranged at the gap 11, the stress applied to the transparent adhesive 4 through the weight of the indicator 3 can be alleviated, and faults such as the peeling of the indicator 3 or display distortion can be inhibited.

The size of the gap 11 may vary according to the dimensional tolerance of the optical device 5 and the upper case 6 positioned with reference to the circuit board 7. However, the thickness of the cushioning material 12 changes with the size of the gap 11, it is not necessary to finely adjust the thickness of the cushioning material 12. As a result, it is possible to easily assemble the indicator 3 and the optical device 5.

In the present embodiment, since the dial 2 made of polycarbonate is adopted as the cover plate, it is possible to reduce to weight as compared with a cover plate made of glass.

Figure 3:
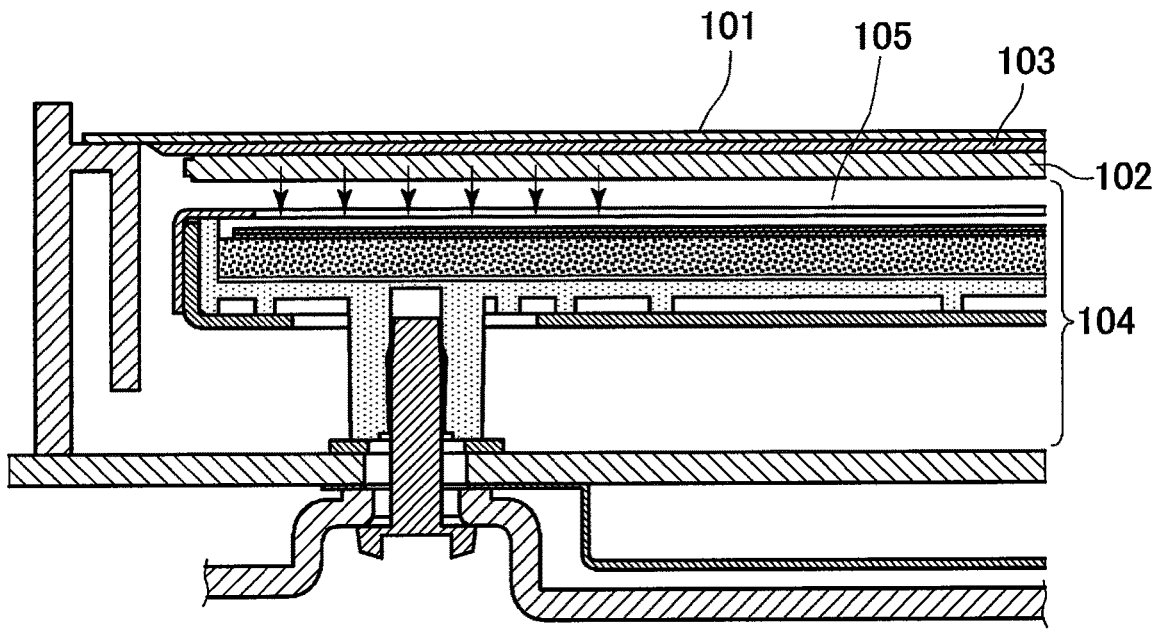
FIG. 3 is a cross sectional view of a display apparatus according to Comparative Example 1.

In contrast, in a display apparatus according to Comparative Example 1 in FIG. 3, a dial 101 and an indicator 102 are stuck together with a transparent adhesive 103; however, a cushioning material is not arranged at a gap 105 between the indicator 102 and the optical device 104. Accordingly, the indicator 102 is in a state of being suspended on the dial 101, the stress is applied to the transparent adhesive 103 due to the weight of the indicator 102. Thus, faults such as the peeling of the indicator 102 or display distortion may happen.

Figure 4:
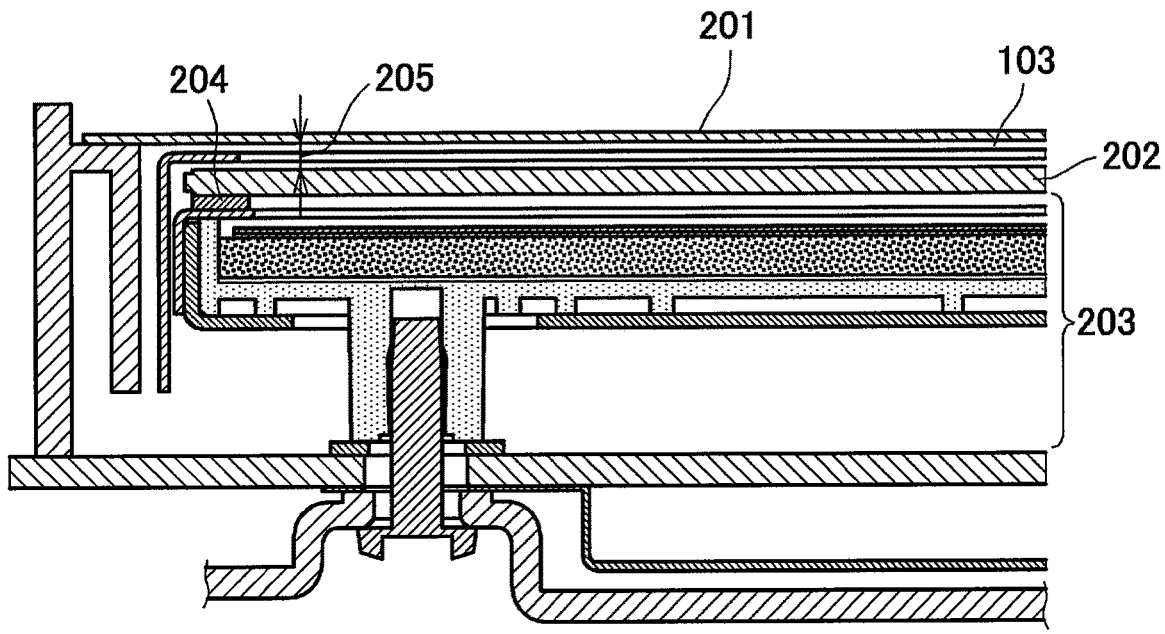
FIG. 4 is a cross sectional view of a display apparatus according to Comparative Example 2.

In a display apparatus according to Comparative Example 2 in FIG. 4, a transparent adhesive is not stuck between the dial 201 and the indicator 202. The indicator 202 is fixed on the optical device 203 with an adhesive 204. However, an air layer 205 is between the dial 201 and the indicator 202, the visibility of the display through the indicator 202 is deteriorated.

Although the disclosure has been described in accordance with the examples, it is understood that the present disclosure is not limited to the above examples or structures. Various changes and modification may be made in the present disclosure. In addition, various combinations and configurations, as well as other combinations and configurations that include only one element, more, or less, are within the scope and spirit of the present disclosure.

For example, the dial is made of polycarbonate in the above-mentioned embodiment; however, the dial may also be made of transparent resin. The cover plate made of glass may be adopted instead of the dial. It is possible to provide a high quality texture by adopting the cover plate made of glass. In the above-mentioned embodiment, the present disclosure is applied to a combination meter. However, the present disclosure may also be applied to other display apparatuses (for example, a screen of a navigation apparatus or a screen for displaying setting contents of an air conditioner). The present disclosure may also be applied to a display apparatus for technology other than vehicles.

The invention claimed is:

1. A display apparatus comprising:
    an indicator configured to display an image on a display surface of the indicator;
    a cover plate stuck on the display surface of the indicator with a transparent adhesive, and including a light transmitting section to enable the display surface to be visible;
    an optical device arranged behind the indicator through a gap to the indicator, and configured to supply a light to a back surface of the indicator for a display on the indicator;
    a first support configured to support the optical device;
    a second support configured to support the cover plate; and
    a cushioning material provided at the gap, and be in contact with both of the indicator and the optical device.

2. The display apparatus according to claim 1, wherein:
    the cushioning material is arranged to surround a peripheral edge of the display surface; and
    the peripheral edge of the display surface is without a display of the image.

3. The display apparatus according to claim 1, wherein:
    the cover plate is made of polycarbonate.

4. The display apparatus according to claim 1, further comprising:
    a shielding member arranged to cover an electronic component mounted to the first support, and configured to shield a noise, which is emitted from the electronic component or is mixed into the electronic component from outside.

5. The display apparatus according to claim 1, wherein:
    the cushioning material is provided with a contracted thickness.

6. The display apparatus according to claim 1, wherein:
    the optical device and the indicator are connected directly through only the cushioning material during which the optical device and the indicator are assembled into the display apparatus.

7. The display apparatus according to claim 1, wherein:
    the optical device includes:
        a light guide plate arranged to cover the back surface of the indicator;
        a plurality of LEDs each emitting a light to a side edge of the light guide plate;
        a white frame arranged at an end surface of the light guide plate to cover a side surface and a back surface of the light guide plate to increase a reflection efficiency inside the light guide plate for enhancing luminance;
        a diffusion sheet arranged to cover a front surface of the light guide plate, and configured to diffuse the light emitted from the front surface of the light guide plate to emit the light uniformly;
        a boss section extending in a rear direction from the white frame to a position of the first support;
        a protective frame arranged to cover a side surface and a back surface of the white frame, and configured to accommodate and protect the light guide plate, the plurality of LEDs and the diffusion sheet; and
        a boundary frame provided in a loop shape along a periphery of the optical device.

* * * * *